US011599077B2

(12) United States Patent
Schroeder

(10) Patent No.: US 11,599,077 B2
(45) Date of Patent: Mar. 7, 2023

(54) METHOD OF OPERATING A SMART HOME APPLIANCE

(71) Applicant: Haier US Appliance Solutions, Inc., Wilmington, DE (US)

(72) Inventor: Michael Goodman Schroeder, Louisville, KY (US)

(73) Assignee: Haier US Appliance Solutions, Inc., Wilmington, DE (US)

(*) Notice: Subject to any disclaimer, the term of this patent is extended or adjusted under 35 U.S.C. 154(b) by 0 days.

(21) Appl. No.: 17/320,314

(22) Filed: May 14, 2021

(65) Prior Publication Data

US 2022/0365501 A1 Nov. 17, 2022

(51) Int. Cl.
*H04L 12/28* (2006.01)
*G05B 19/042* (2006.01)
*G08B 21/18* (2006.01)
*G06F 3/0484* (2022.01)
*H04L 67/12* (2022.01)

(52) U.S. Cl.
CPC ......... *G05B 19/042* (2013.01); *G06F 3/0484* (2013.01); *G08B 21/18* (2013.01); *H04L 12/2816* (2013.01); *G05B 2219/2642* (2013.01); *H04L 67/12* (2013.01)

(58) Field of Classification Search
USPC .................................................. 700/28, 275
See application file for complete search history.

(56) References Cited

U.S. PATENT DOCUMENTS

| 6,736,531 B2* | 5/2004 | Wallach | F21V 21/145 |
| | | | 362/396 |
| 9,501,924 B2 | 11/2016 | Boda et al. | |
| 10,219,202 B1* | 2/2019 | Malasani | H04W 4/30 |
| 10,613,556 B2 | 4/2020 | Cottrell | |
| 10,690,369 B2 | 6/2020 | Astier | |
| 2003/0074590 A1* | 4/2003 | Fogle | G06F 1/3203 |
| | | | 713/320 |
| 2006/0208099 A1* | 9/2006 | Chapman | F24H 9/2007 |
| | | | 236/51 |
| 2016/0189526 A1* | 6/2016 | Kennedy | G08B 25/008 |
| | | | 340/541 |
| 2016/0258647 A1* | 9/2016 | Imes | H02J 13/00017 |
| 2017/0074568 A1* | 3/2017 | Orozco | F25D 17/06 |

FOREIGN PATENT DOCUMENTS

CN 105159107 B 1/2019

* cited by examiner

*Primary Examiner* — Emilio J Saavedra
(74) *Attorney, Agent, or Firm* — Dority & Manning, P.A.

(57) ABSTRACT

A method of operating multiple home appliances within a smart home set up, including monitoring physical interactions with at least one appliance and measuring an amount of time since the interaction. The smart home network can activate a vacation mode including altering one or more operating modes of the appliance or alert a user via a mobile device to initiate a vacation mode.

18 Claims, 8 Drawing Sheets

METHOD OF OPERATING A SMART HOME APPLIANCE

FIELD OF THE INVENTION

The present subject matter relates generally to home appliances, and more particularly to systems and methods for operating multiple home appliances.

BACKGROUND OF THE INVENTION

Home appliances are utilized generally for a variety of tasks by a variety of users. For example, a household may include such appliances as laundry appliances, e.g., a washer and/or dryer, kitchen appliances, e.g., a refrigerator, a microwave, a dishwasher, and/or a coffee maker, along with room air conditioners and other various appliances. Some home appliances can also include features for connecting to and communicating over a secure wireless network. Such communication may provide connected features on the home appliances, e.g., where the home appliance communicates with a personal device, smart home systems, and/or a remote database such as a cloud server.

Many home appliance (e.g., refrigerators, washer/dryers, thermostats, water heaters, HVAC units, etc.) have myriad settings to provide convenience and performance to users. For instance, automatic operation may be programmed into certain appliances. Additionally or alternatively, settings such as eco-friendly settings may be incorporated during periods of low or no use, providing potential energy savings and reducing fatigue due to unnecessary use. However, with conventional home appliances, a user must perform a manual adjustment to incorporate these settings. Users may forget to change settings or modes of home appliances before extended periods of low or no usage, resulting in these appliances operating as normal, expending excess energy, and incurring undue cost of operation.

Accordingly, a system and method for operating one or more home appliances that obviates one or more of the above-mentioned drawbacks would be beneficial. Particularly, a method of operating a home appliance that more efficiently adjusts operating modes of the home appliance would be advantageous.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a method of operating an appliance is provided. The appliance may include an interactive user interface, a timer, and a sensor in communication with the interactive user interface and the timer. The method may include obtaining a predetermined time threshold; determining that the interactive user interface has been triggered; initiating a timer sequence via the timer in response to determining that the interactive user interface has been triggered; determining that the timer sequence has elapsed the predetermined time threshold; and implementing a responsive action in response to determining that the timer sequence has elapsed the predetermined time threshold.

In another exemplary aspect of the present disclosure, an appliance is disclosed. The appliance may include an interactive user interface; a sensor for sensing a triggering of the interactive user interface; and a controller in communication with the interactive user interface and the sensor. The controller may be configured to perform a series of operations, including obtaining a predetermined time threshold, determining, via the sensor, that the interactive user interface has been triggered, initiating a timer sequence in response to determining that the interactive user interface has been triggered, determining that the timer sequence has elapsed the predetermined time threshold, and implementing a responsive action in response to determining that the timer sequence has elapsed the predetermined time threshold.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
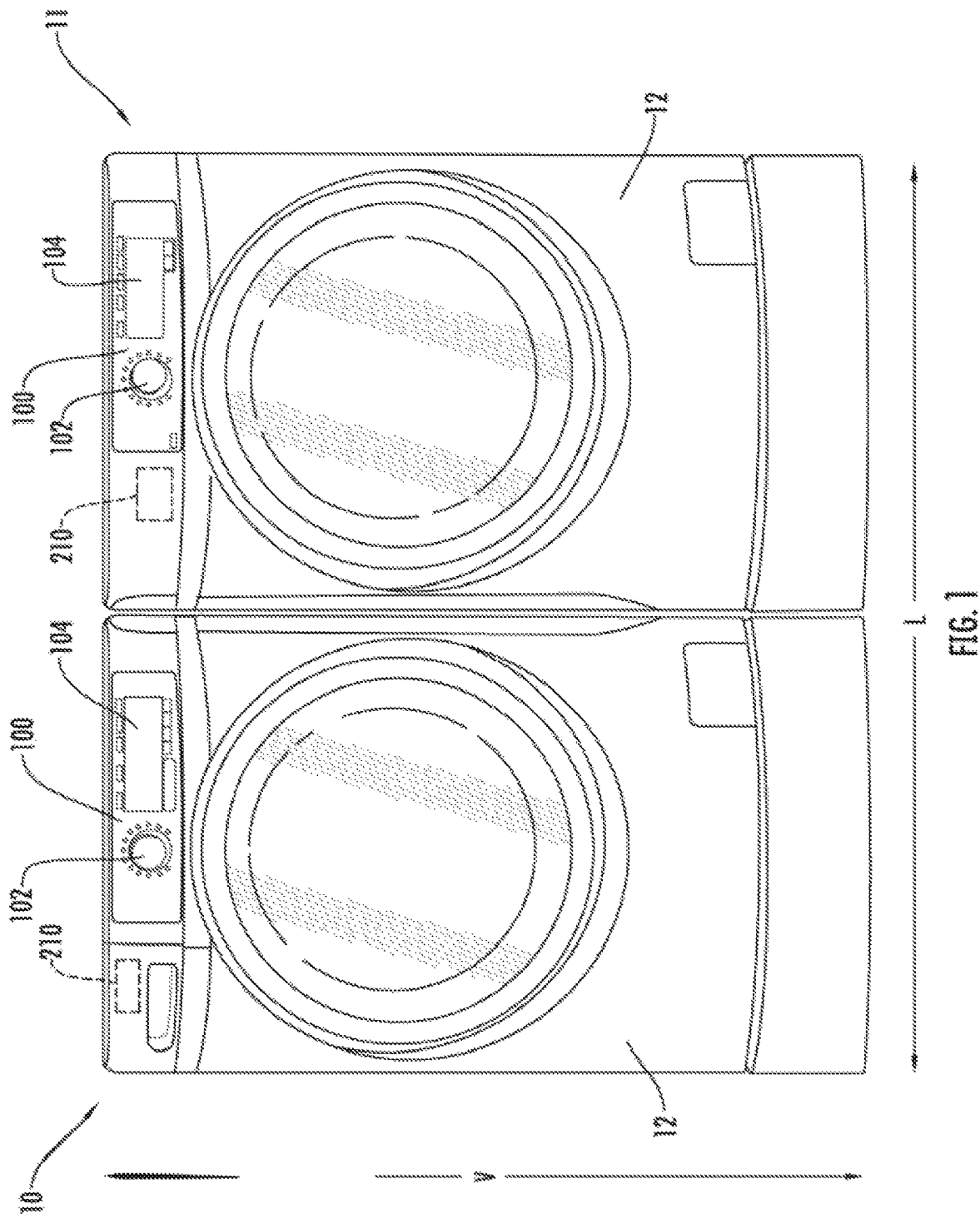
FIG. 1 provides a front view of exemplary laundry appliances in accordance with one or more embodiments of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As may be seen in FIGS. 1 through 6, in accordance with one or more embodiments of the present subject matter, an appliance 10 is provided. For example, appliance 10 in FIG. 1 is a washing machine appliance and dryer appliance 11. The appliance may have a cabinet 12 which defines a vertical direction V, a lateral direction L and a transverse direction T that are mutually perpendicular. The cabinet 12 may extend between a top portion 13 and a bottom portion 14 along the vertical direction V. The cabinet 12 may also extend between a first side portion 15 and a second side portion 16, e.g., along the lateral direction L, and a front portion 17 and a back portion 18, e.g., along the transverse direction T.

In addition, as shown, the appliance 10 includes a user interface 100 (e.g., an interactive user interface) and a user input device 102 that may be positioned on an exterior of the cabinet 12. The user input device 102 is generally positioned proximate to the user interface 100, and in some embodiments, the user input device 102 may be positioned on the user interface 100. The appliance 10 may also include features for detecting the presence of a user, as will be described in more detail below. For instance, the user interface may be an interactive user interface, such as a control panel, a selector knob, a dispenser arm, a door switch (e.g., the opening and closing of a door), or the like.

In various embodiments, the user interface 100 may represent a general purpose I/O ("GPIO") device or functional block. In some embodiments, the user interface 100 may include or be in operative communication with user input device 102, such as one or more of a variety of digital, analog, electrical, mechanical, or electro-mechanical input devices including rotary dials, control knobs, push buttons, and touch pads. The user interface 100 may include a display component 104, such as a digital or analog display device designed to provide operational feedback to a user. The display component 104 may also be a touchscreen capable of receiving a user input, such that the display component 104 may also be a user input device in addition to or instead of the user input device 102.

Generally, the appliance 10 may also include a controller 210 in operative communication with the user input device 102. The user interface 100 and the user input device 102 may be in communication with the controller 210 via, for example, one or more signal lines or shared communication busses. Input/output ("I/O") signals may be routed between controller 210 and various operational components of the appliance 10. Operation of the appliance 10 can be regulated by the controller 210 that is operatively coupled to the user interface 100. A user interface 100 may, for example, provide selections for user manipulation of the operation of an appliance, e.g., via user input device 102 and/or display 104. In response to user manipulation of the user interface 100 and/or user input device 102, the controller 210 may operate various components of the appliance 10. Further, the controller 210 may include a memory and one or more microprocessors, CPUs, or the like, such as general or special purpose microprocessors operable to execute programming instructions or micro-control code associated with operation of the appliance 10. The memory may represent random access memory such as DRAM, or read only memory such as ROM or FLASH. In one embodiment, the processor executes programming instructions stored in memory. The memory may be a separate component from the processor or may be included onboard within the processor. Additionally or alternatively, the controller 210 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

The controller 210 may be programmed to operate the appliance 10 by executing instructions stored in memory. For example, the instructions may be software or any set of instructions that when executed by the processing device, cause the processing device to perform operations. Moreover, the controller 210 can include one or more processor(s) and associated memory device(s) configured to perform a variety of computer-implemented functions and/or instructions (e.g., performing the methods, steps, calculations and the like and storing relevant data as disclosed herein). It should be noted that the controller 210 as disclosed herein may be capable of and may be operable to perform any methods and associated method steps as disclosed herein. Further, as described herein, user interface 100 may include one or more sensors in communication with controller 210 to alert controller 210 as to an interaction between a user and the user interface 100. For example, the sensor may be a pressure sensor, a capacitive touch sensor, an optic sensor, a contact switch sensor, a proximity sensor, or the like.

In some embodiments, for example, as illustrated in FIG. 1, the appliance 10 may be one of a set of two or more appliances. In the exemplary embodiment illustrated in FIG. 1, the appliance 10 may be one of a pair of laundry appliances, e.g., the appliance may be a washer and/or dryer 11. In embodiments such as illustrated in FIG. 1, the user input device 102 of each appliance may be positioned on the user interface 100 of each appliance. The embodiment illustrated in FIG. 1 also includes a display 104 on the user interface.

Figure 2:
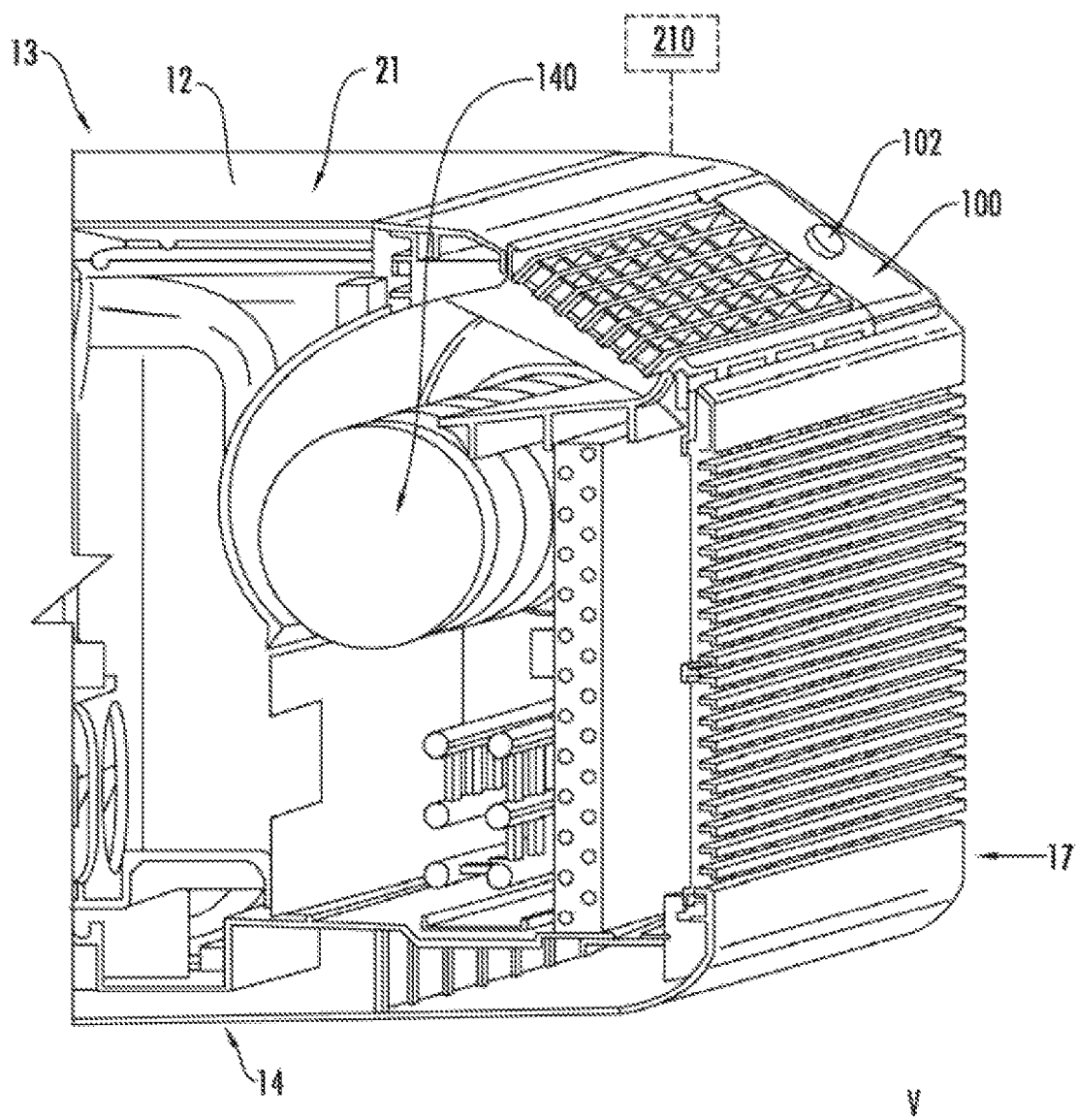
FIG. 2 provides a partial perspective view of an exemplary air conditioner appliance in accordance with additional embodiments of the present disclosure.

FIG. 2 illustrates another example embodiment of the appliance 10, wherein the appliance 10 is an air conditioner 21. As illustrated, the air conditioner 21 includes cabinet 12, user interface 100 and user input device 102. In the illustrated example of FIG. 2, the user input device 102 is a control knob, similar to those illustrated in FIGS. 1 and 6. The air conditioner 21 may also include a controller 210, and the controller 210 may be configured to activate the air conditioner 21, e.g., by turning on fan 140 to circulate air.

Figure 3:
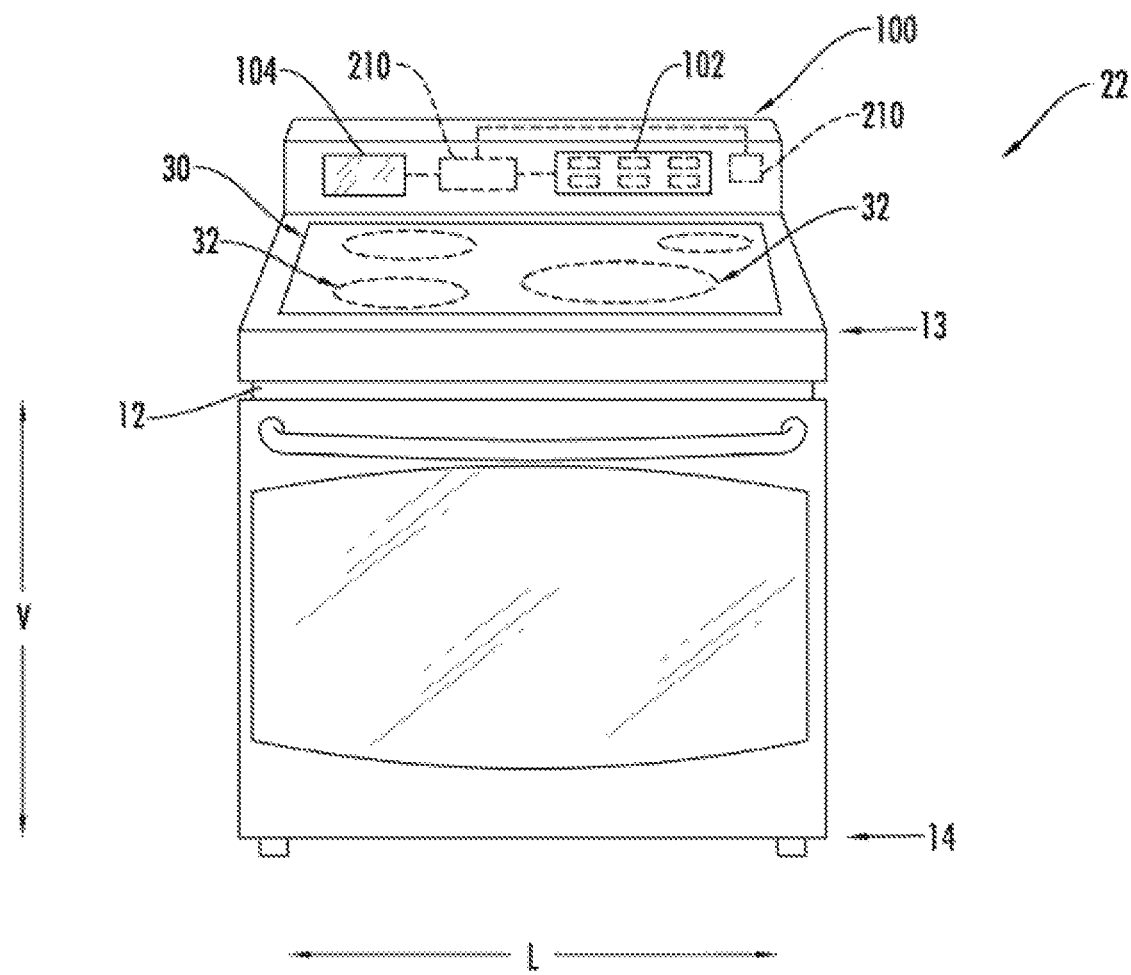
FIG. 3 provides a perspective view of an oven appliance in accordance with additional embodiments of the present disclosure.

FIG. 3 illustrates another example embodiment of the appliance 10, wherein the appliance 10 is an oven range 22 including a cooktop and an oven. Further, as shown, the exemplary oven range appliance 22 illustrated in FIG. 3 includes user interface 100 and user input device 102. In the illustrated example of FIG. 3, the user input device 102 is a touch screen interface. The oven range appliance 22 is provided by way of example only and is not intended to limit the present subject matter in any aspect. Thus, the present subject matter may be used with other oven appliance configurations, e.g., that define one or more interior cavities for the receipt of food and/or having different heating element arrangements than what is shown in FIG. 3. Further, the present subject matter may be used in a stand-alone cooktop, a hot plate, or any other suitable appliance.

As illustrated in FIG. 3, the oven range appliance 22 generally includes a cooking assembly. The cooking assembly may include one or more heating elements. For example, in some embodiments, the cooking assembly includes cabinet 12 which in some embodiments may be an insulated cabinet 12 with an interior cooking chamber (not shown) configured for the receipt of one or more food items to be cooked defined within insulated cabinet 12. Such cooking chambers are generally understood by those of ordinary skill in the art and are not described in further detail herein. The oven range appliance 22 may additionally include a cooktop 30. Further, as shown, the cooktop 30 may be disposed on the cabinet 12 generally at or proximate to top portion 13. The cooktop 30 includes one or more heating assemblies 32, e.g., electric heating elements or gas burners, thereon.

Figure 4:
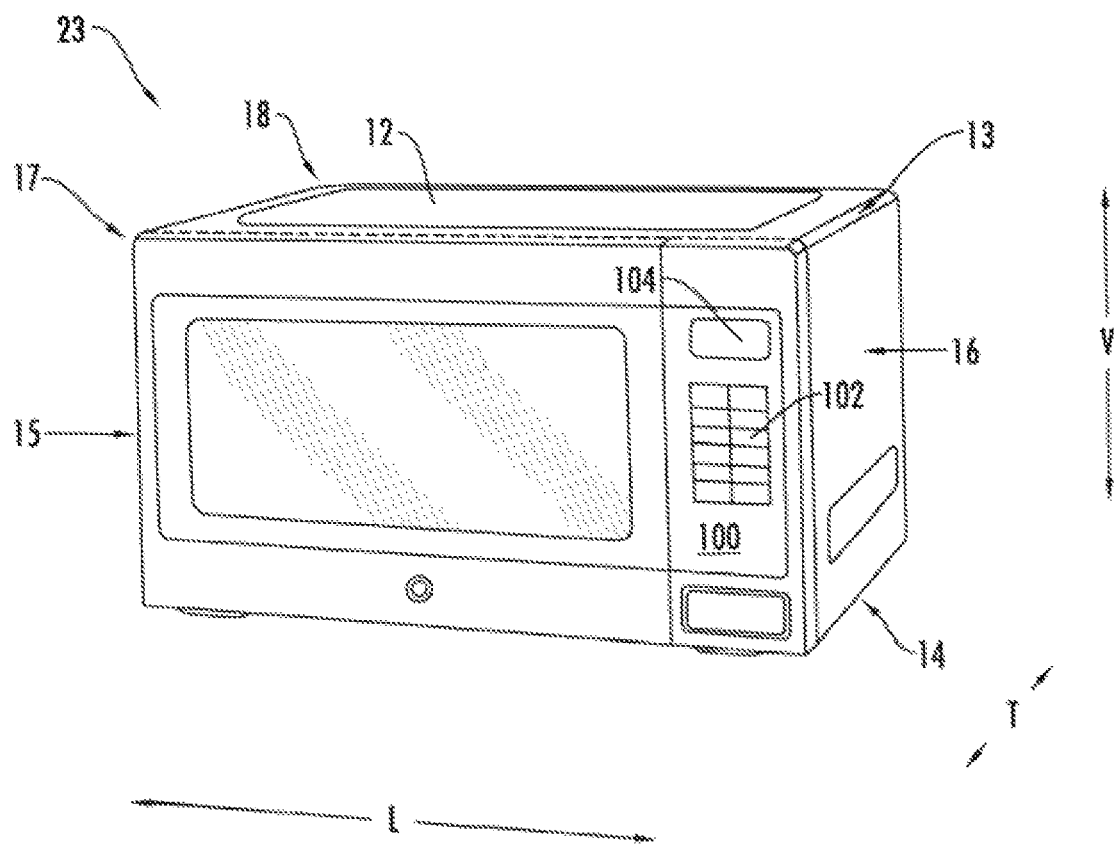
FIG. 4 provides a perspective view of a microwave oven appliance in accordance with additional embodiments of the present disclosure.

In another example embodiment, the appliance 10 may be a microwave oven appliance 23, such as is illustrated in FIG. 4. It should be understood that microwave oven appliance 23 is provided by way of example only. Thus, the present subject matter is not limited to microwave oven appliance 23 and may be utilized in any suitable appliance.

The microwave oven appliance 23 includes a cabinet 12. A cooking chamber is defined within the cabinet 12 of the microwave 23. Further, the microwave appliance 23 of FIG. 4 is configured to heat articles, e.g., food or beverages, within the cooking chamber using electromagnetic radiation. Moreover, the microwave appliance 23 may include various components which operate to produce the electromagnetic radiation, as is generally understood. For example, the microwave appliance 23 may include a magnetron (such as, for example, a cavity magnetron), a high voltage transformer, a high voltage capacitor and a high voltage diode. The transformer may provide energy from a suitable energy source (such as an electrical outlet) to the magnetron. The magnetron may convert the energy to electromagnetic radiation, specifically microwave radiation. The capacitor generally connects the magnetron and transformer, such as via high voltage diode, to a chassis. Microwave radiation produced by the magnetron may be transmitted through a waveguide to the cooking chamber. The structure and intended function of microwave ovens are generally understood by those of ordinary skill in the art and are not described in further detail herein.

Figure 5:
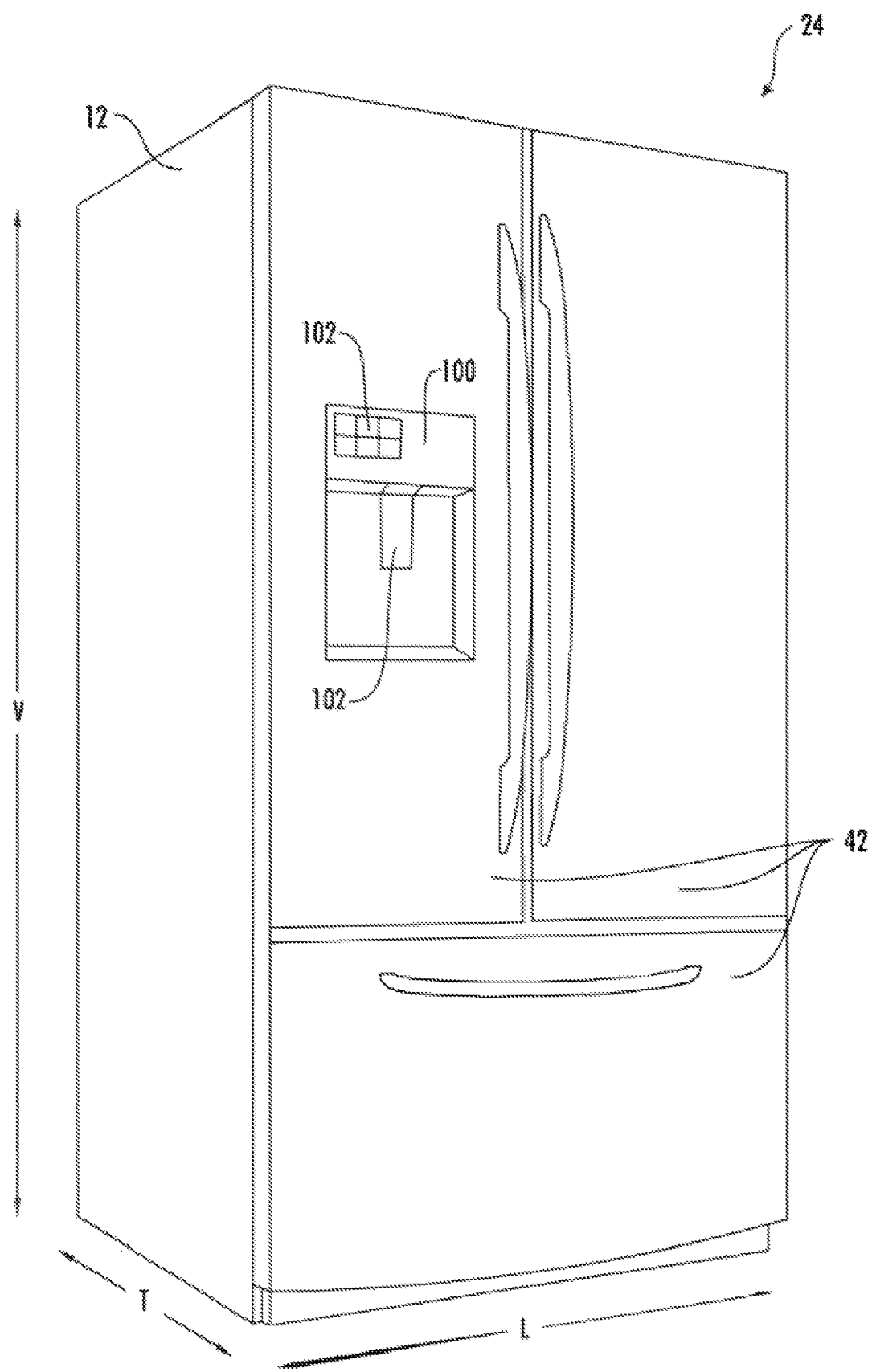
FIG. 5 provides a perspective view of a refrigeration appliance in accordance with additional embodiments of the present disclosure.

In another embodiment, the appliance 10 may be a refrigerator appliance 24, such as is illustrated in FIG. 5. FIG. 5 provides a perspective view of a refrigerator appliance 24 according to an exemplary embodiment of the present subject matter. Further, as shown, the refrigerator appliance 24 may include a cabinet 12. The example refrigerator appliance 24 depicted in FIG. 5 is generally referred to as a bottom mount refrigerator appliance. However, it should be understood that refrigerator appliance 24 is provided by way of example only. Thus, the present subject matter is not limited to refrigerator appliance 24 and may be utilized in any suitable appliance, including without limitation, side-by-side style refrigerator appliances or top mount refrigerator appliances as well.

The refrigerator appliance 24 may also include a dispensing assembly for dispensing, e.g., liquid water and/or ice to, for example, a dispenser recess defined on the exterior of the cabinet, as is generally understood in the art. Thus, in some embodiments, the appliance 10 may be a refrigerator appliance 24 and the user interface 100 may be or include a control panel of the dispensing assembly. Further with reference to the exemplary embodiment illustrated in FIG. 5, in some exemplary embodiments including refrigerator appliance 24 and a dispensing assembly, the user input device 102 may be a paddle of the dispensing assembly, the paddle 102 in FIG. 5 being an exemplary embodiment of the user input device. Such dispensing assemblies, including actuators therefor such as paddles, levers, etc., are generally understood in the art and are not described further herein. Additionally or alternatively, the user input device 102 may include one or more doors 42. For instance, controller 210 may register an input of refrigerator appliance 24 when a user opens one of the doors 42. In detail, a switch or sensor may be provided adjacent to door 42 and configured to register an opening and/or closing of door 42. The switch may then relay the action of door 42 to controller 210.

Figure 6:
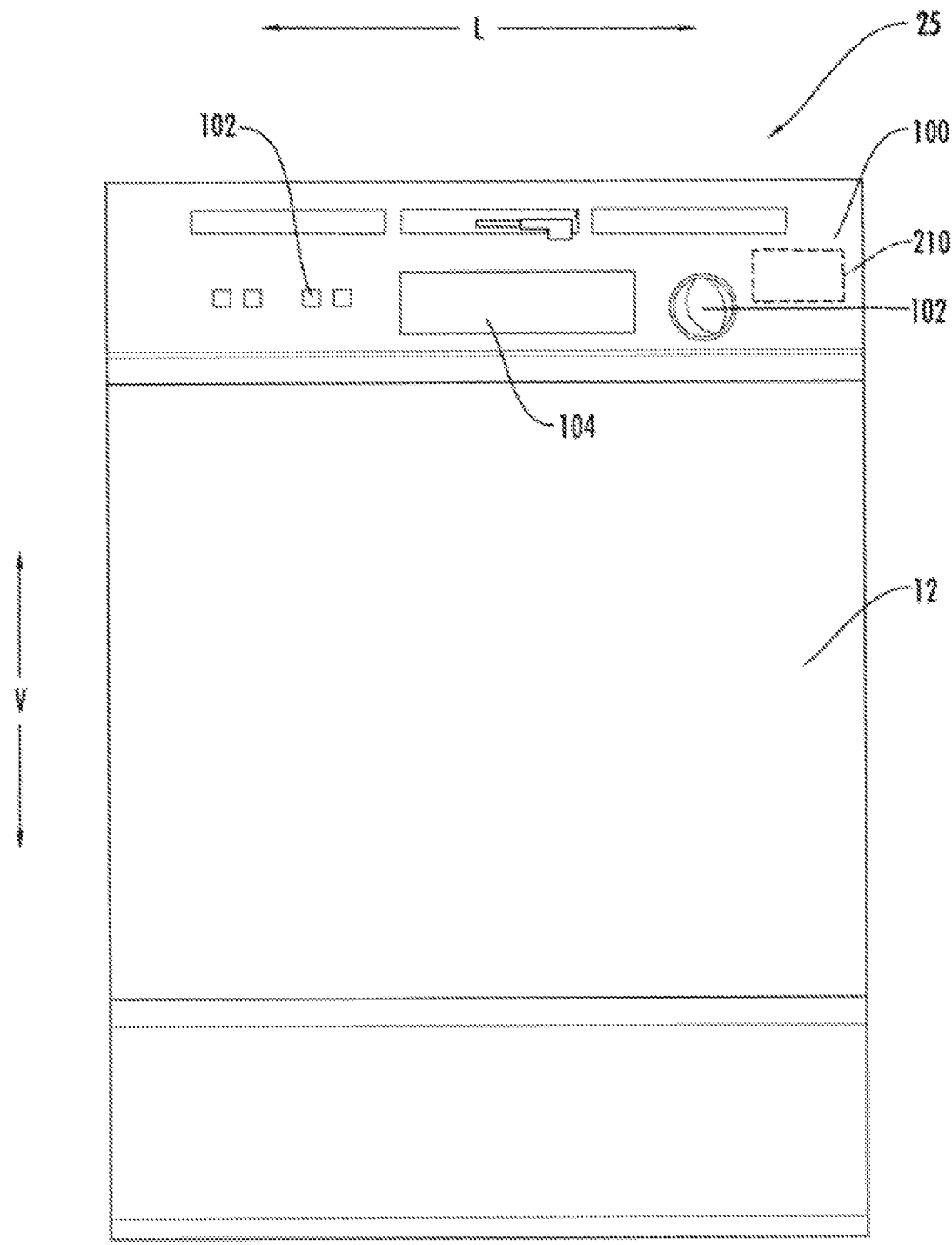
FIG. 6 provides a front view of a dishwashing appliance in accordance with additional embodiments of the present disclosure.

FIG. 6 provides a front view of a dishwashing appliance 25 according to yet another exemplary embodiment of the present subject matter. The dishwashing appliance includes a cabinet 12 with a user interface 100 thereon. In the illustrated example embodiment of the FIG. 6, the user interface includes multiple user input devices 102, e.g., a knob and a plurality of buttons, as well as a display 104. In various embodiments, any suitable combination of any one or more of the illustrated user input devices 102 and display 104 may be provided. Additionally or alternatively, a door of the dishwashing appliance 25 may constitute a user input device 102 (e.g., opening and closing the door).

According to various embodiments of the present disclosure, the appliance 10 may take the form of any of the examples described above, or may be any other household appliance where improved ease of connecting to a secure wireless network is desired. Thus, it will be understood that the present subject matter is not limited to any particular household appliance.

Figure 7:
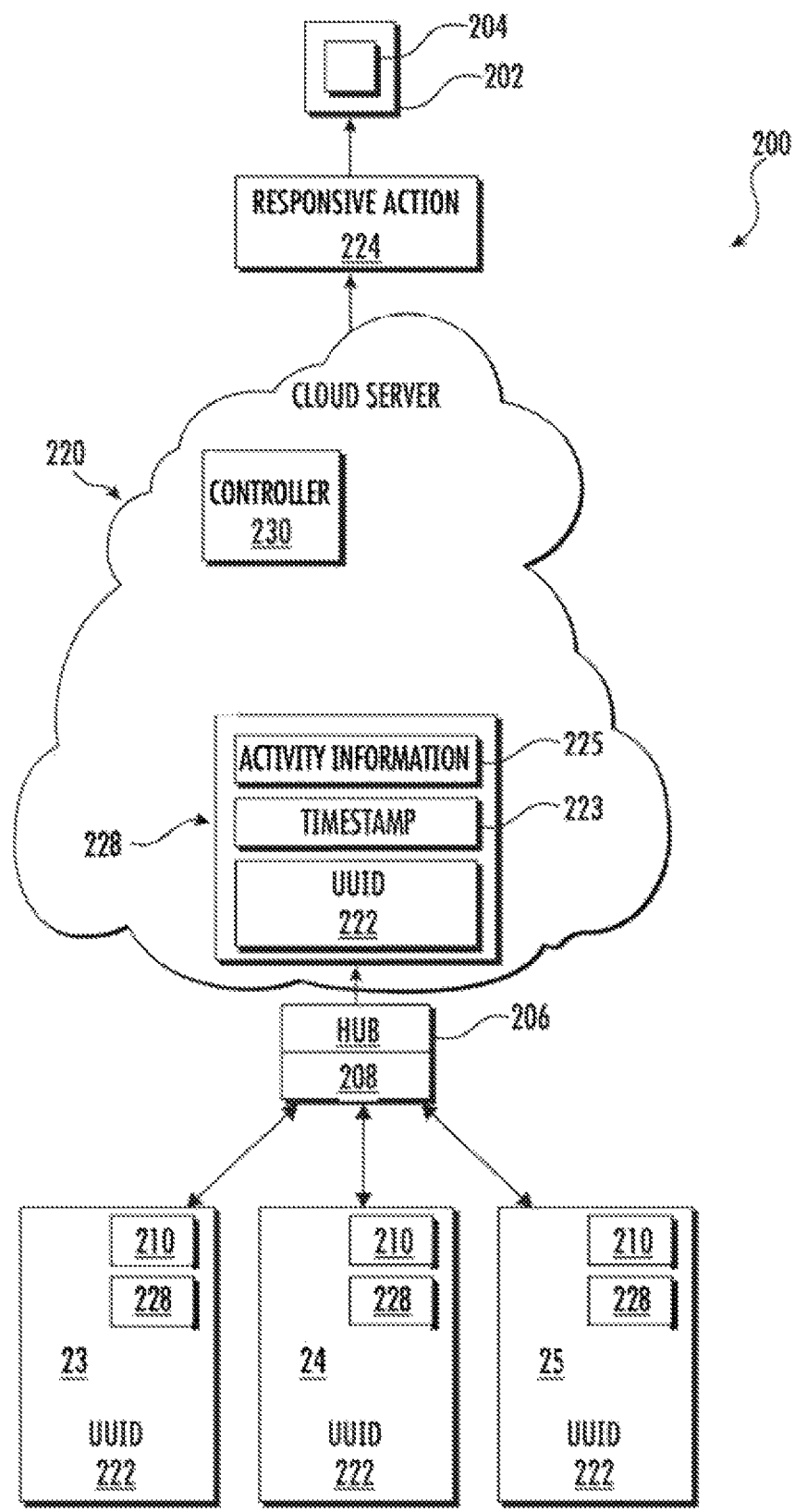
FIG. 7 provides a schematic diagram of a system for monitoring operational data relating to a household appliance for improved performance according to one or more embodiments of the present disclosure.
Figure 8:
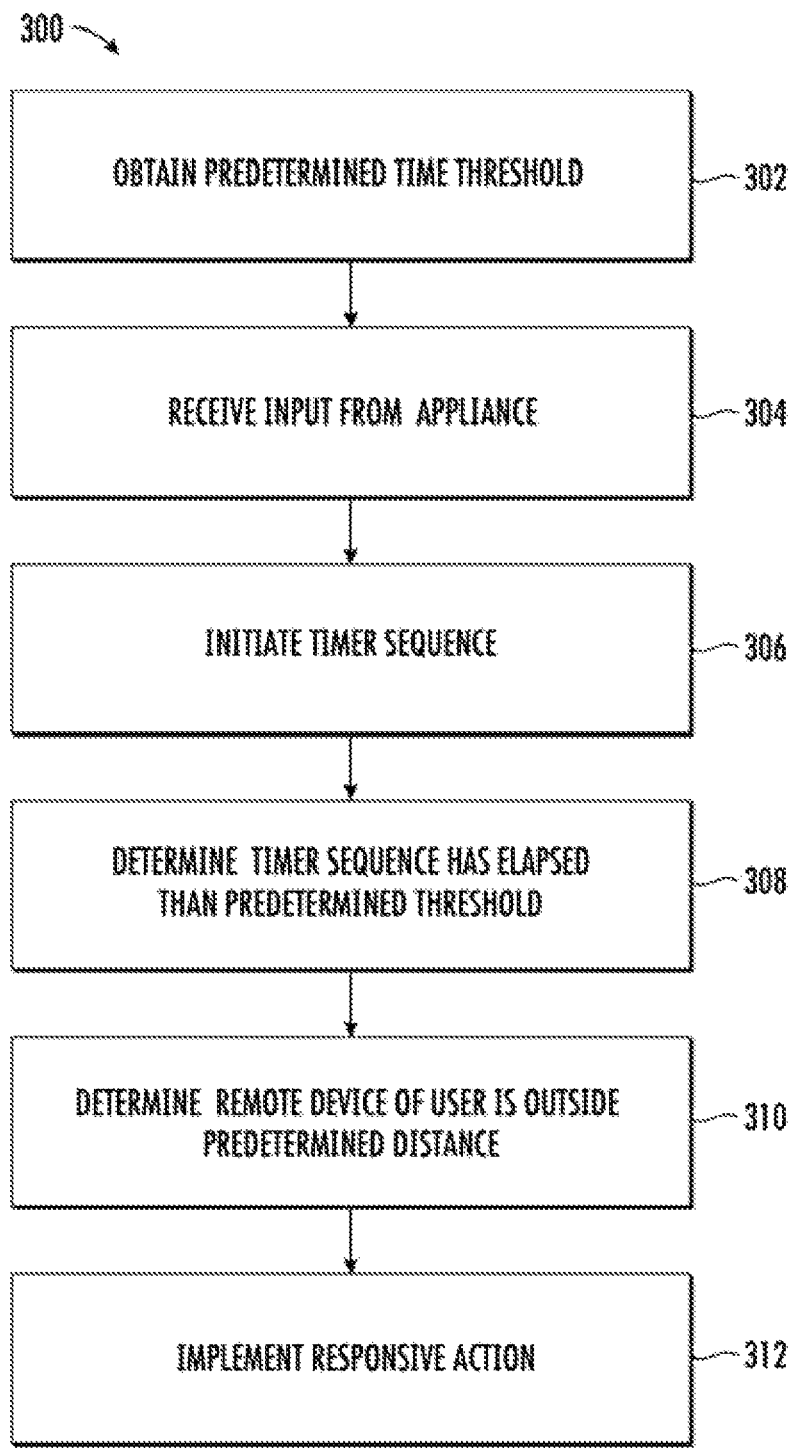
FIG. 8 provides a flowchart illustrating a method of operating an appliance according to an exemplary embodiment of the present disclosure.

Referring now to FIGS. 7 and 8, a schematic diagram of one embodiment of a system of connected appliances 200 and process flow diagram 300 for sensing a user interaction with a household appliance, such as one of the exemplary appliances discussed above, according to the present disclosure. In detail, one or more of the appliances discussed above may be collectively referred to as a system of connected appliances 200. As shown, when a consumer interacts with one of the appliances (e.g., by performing a physical action to or with the appliance), the appliance may acknowledge the interaction and perform a responsive action, as described in more detail below.

Moreover, as shown, the appliance, and in particular, the controller 210 and user interface 100 thereof, may be configured to communicate with a separate device external to the appliance, such as a communications device or other remote device 202 via a network. The remote device 202 may be a laptop computer, smartphone, tablet, personal computer, wearable device, smart home system, and/or various other suitable devices including a user interface such as a touchscreen display 204. The appliance may be in communication with the remote device 202 through various possible communication connections and interfaces.

The remote device 202 may include a memory for storing and retrieving programming instructions. Thus, the remote device 202 may provide a remote user interface which may be an additional user interface to the user interface 100. For example, the remote device 202 may be a smartphone operable to store and run applications, also known as "apps," and the remote user interface may be provided as a smartphone app.

In certain embodiments, the appliance and the remote device 202 may be matched in wireless communication, e.g., connected to the same wireless network. The appliance may communicate with the remote device 202 via short-range radio such as BLUETOOTH® or any other suitable wireless network having a layer protocol architecture. As used herein, "short-range" may include ranges of about ten meters or less, up to about one hundred meters. For example, the wireless network may be adapted for short-wavelength ultra-high frequency (UHF) communications in a band between 2.4 GHz and 2.485 GHz (e.g., according to the IEEE 802.15.1 standard). In particular, BLUETOOTH® Low Energy, e.g., BLUETOOTH® Version 4.0 or higher, may advantageously provide short-range wireless communication between the appliance and the remote device 202. For example, BLUETOOTH® Low Energy may advantageously minimize the power consumed by the exemplary methods and devices described herein due to the low power networking protocol of BLUETOOTH® Low Energy.

Further, as explained in more detail below, the consumer may interact with one or more appliances. In response, the controller 210 of the selected appliance with which the user interacts may receive a notification to reset a timer assigned to the household appliance. The consumer can initiate such selection via the user interface 100 of the appliance, the remote user interface 202, and/or a separate central computing hub 206. For example, as shown in FIG. 7, the consumer may have a plurality of household appliances (e.g., the system of connected appliances 200) communicatively coupled to the central computing hub 206, which may also have a user interface 208. As such, the consumer may also select which of the household appliances he or she wishes to monitor using the central computing hub 206.

Additionally or alternatively, system 200 may include a cloud server 220. For instance, data regarding user inputs to the appliance may be transmitted to cloud server 220, which may then be transmitted to a remote device (e.g., remote device 202) of a user. Cloud server 220 may collect and transmit data packets 228 from each individual appliance, which may include activity information 225 as well as time information 223 (e.g., a length of time between physical interactions with the appliance). Further, in some embodiments, cloud server 220 may include a separate controller 230 which may analyze the information (e.g., data packet 228) and determine a responsive action 224 to send to remote device 202.

The controller 210 may also transmit a universally unique identifier (UUID) 222 of the household appliance 10 along with the data packet 228 to the cloud server 220. For example, as shown in FIG. 7, each appliance 10 may include a UUID 222. Thus, as shown, the data packet 228 may include the UUID 222, an appliance type, and/or a model number. In addition, as shown, the controller 210 may also generate a timestamp 223 at the time of receiving the notification and transmit the timestamp with a stored file to the cloud server 220.

Referring to FIG. 8, a method 300 for operating an appliance (e.g., appliance 10) is described. Method 300 may be performed on any suitable appliance, such as one or more of those described above, in a central hub (e.g., hub 206), or in a cloud-based server (e.g., cloud server 220).

At step 302, method 300 may include obtaining a predetermined time threshold. In detail, the controller (e.g., controller 210 or controller 220) may obtain a time threshold of at least one connected appliance, an elapsing of which may indicate a prolonged absence of a user. For instance, a timer may be incorporated into the controller of each connected appliance, or into the controller of a hub (e.g., hub 206), or into the cloud server. The timer may be programmed to measure a length of time between interactions with the connected appliance, which will be described in more detail below. For instance, when the user triggers or interacts with the connected appliance, the timer may initiate. When the user subsequently triggers or interacts with the connected appliance, the timer may reset and reinitiate. The predetermined time threshold obtained by the controller may be preprogrammed into the connected appliance (or hub or cloud server), or may be manually set by the end user. Further, the time threshold may be indicative of a length of time for which a person may be deemed on vacation. In detail, the predetermined time threshold may be set such that, once elapsed, the controller may assume the user is away from the connected appliance (e.g., away from home). In some embodiments, the predetermined time threshold may be between 12 and 48 hours.

At step 304, method 300 may include receiving an input from a connected appliance. For instance, the input from the connected appliance may be an interaction between the user and the connected appliance. In other words, the interactive user interface may be triggered by the user. As described above, the connected appliance may include one or more interactive user interfaces (e.g., user interface 100 or user input device 102). In some embodiments, the interactive user interface may also include physically movable things, such as doors, drawers, dials, knobs, levers, and the like. For example, a user may open a door of a refrigerator. The refrigerator may recognize the operation of the user opening the door (e.g., via a sensor or sensing device). For another example, the user may manipulate a thermostat to a specific temperature. In some embodiments, the input may be referred to as an activity trigger. For instance, a user may initiate an operation of an appliance (e.g., a laundry operation in a washing machine) via a mobile app on a mobile device (e.g., smartphone). The controller may recognize this activity trigger as an input to the appliance. A table providing exemplary actions for some appliances is provided below in Table A. It should be understood that these actions are merely examples of interactions between a user and the connected appliance, and that any suitable physical interaction between the user and the connected appliance may result in an input from the connected appliance.

TABLE A

| | |
|---|---|
| Refrigerator | Proximity sensor, door opening, dispenser use, button presses |
| Oven Range | Door opening, button presses, timer set |
| Microwave | Door opening, button presses |
| Laundry appliance | Button presses, knob turns, cycle start |
| Water Heater | Local button presses |
| Dishwasher | Door opening, button presses, cycle start |
| Thermostat | Knob turns, button presses, temperature setting |

At step 306, method 300 may include initiating the timer sequence via the timer, in response to receiving the input from the connected appliance. As discussed previously, the controller of the connected appliance (or a controller of a hub or cloud server) may include a timer. When the user triggers the interactive user interface of one or more connected appliances, the controller may initiate a timer sequence. For example, when a user opens a door of a refrigerator, the controller (of the refrigerator, the hub, the cloud server, etc.) may initiate a timer sequence. Additionally or alternatively, a central timer, for instance, in the hub or cloud server, may receive inputs from multiple connected appliances. In one example, a user operating a water dispenser (e.g., in a refrigerator door) may initiate the timer, while a user (the same user or a different user) initiates a laundry operation in a laundry machine at a later time may also be registered by the timer.

In some embodiments, the timer is reset when a subsequent triggering of an interactive user interface occurs. For instance, in the example described above, the timer sequence may be initiated when the user operates the water dispenser (e.g., a first triggering of an interactive user interface). When the user then initiates the laundry operation at a later time, the controller may reset the timer sequence to a zero count. In detail, the timer sequence is reinitiated from zero upon the user initiating the laundry operation. A resetting or reinitiating of the timer sequence may be triggered by a user interaction with any interactive user interface of any connected appliance. Accordingly, one or more of the controllers may determine that one or more users are in the vicinity of the appliances (e.g., at home).

At step 308, method 300 may include determining that the timer sequence has elapsed the predetermined time threshold. As discussed previously, the predetermined time threshold may be set to a specific length (e.g., indicating an elongated absence). When no interaction is made between a user and at least one of the interactive user interfaces of the connected appliances, the timer sequence continues uninterrupted. Upon elapsing the predetermined time threshold, method 300 proceeds to step 310.

At step 310, method 300 may include determining that a remote device of a user is outside of a predetermined distance from one or more of the connected appliances. In detail, in response to determining that the timer sequence has elapsed the predetermined time threshold, the controller may additionally determine a location of at least one user. For instance, one or more users of the particular appliance or connected appliances may establish a virtual connection with at least one of the connected appliances (or the hub) via a remote device (e.g., remote device 202). The connection may be through a network, such as the network described above. Thus, the controller may monitor the network for the remote device and confirm that the remote device is connected or disconnected to the network. Therefore, in some embodiments, the predetermined distance is simply determined by the remote device being connected to the same network as the appliance. In some instances, multiple remote devices belonging to multiple users may be monitored by the controller. The controller may determine that any one of the multiple remote devices is outside of the predetermined distance from the connected appliances, via the network.

In alternate embodiments, the predetermined distance may be set according to a GPS (global positioning system) location of the user's remote device. In detail, the user may grant permission to the connected appliance (e.g., the controller of the appliance or hub) to monitor a GPS location of the user's remote device. This permission may be granted through a mobile application (or app) installed on the remote device. The controller may then receive an alert when the remote device is outside of the predetermined distance and the timer sequence has elapsed the predetermined time threshold. In this embodiment, the predetermined distance may be about 20 miles to about 100 miles away from the selected connected appliance or hub. Accordingly, if the controller determines that at least one previously connected remote device is outside of the predetermined distance, method 300 may proceed to step 312.

At step 312, method 300 may include implementing a responsive action. In detail, in response to determining that the timer sequence has elapsed the predetermined threshold, the controller may implement one of several responsive actions. In some embodiments, step 312 may commence immediately after step 308 (i.e., without determining a location of a remote device). The controller may determine that the user is away from the connected appliance, and thus is likely away from home, by monitoring the physical interactions with the connected appliance(s). Thus, the responsive action may be associated with an away mode or vacation mode of the appliance(s).

In some embodiments, the responsive action may include prompting the user to alter a standard operating mode of one or more connected appliances to an adjusted operating mode. For example, the controller may send an alert to the remote device of the user (e.g., via text message, email, or through the app described above). The alert may request a confirmation from the user that the user is or will be away from the connected appliances (or home) for an extended period of time. For instance, the controller may suggest to the user to set one or more connected appliances to alternate modes (e.g., vacation modes, away modes, economical modes, low power modes, etc.). As an example, the controller may prompt the user whether they are on vacation. If the user responds in the affirmative, the controller may prompt the user to enter a vacation mode. The vacation mode may be a single vacation mode that adjusts all connected appliances or may prompt the user to select preferences for each individual connected appliance. Further to the example, the user may select to enter the vacation mode. The controller may then adjust one or more parameters of one or more of the connected appliances.

The one or more parameters may vary according to each individual appliance. For example, in a vacation mode, a thermostat may be set to economically-friendly temperatures (e.g., higher than normal in the summer, cooler than normal in the winter). For connected appliances having lights or stand-by states, the vacation mode may turn off the lights or institute the stand-by state. Additionally or alternatively, the user may manually set vacation or away mode preferences to be altered upon being prompted. An exhaustive list of adjustable parameters will be foregone for the sake of brevity.

In alternate embodiments, the responsive action may include altering the standard operating mode of the one or more connected appliances to the adjusted operating mode automatically, and alerting the user via the remote device that the operating mode has been changed. In some instances, upon determining that the timer sequence has elapsed the predetermined time threshold without any physical activity from the user and determining that the user is outside of the predetermined distance (e.g., via the remote device), the controller may automatically adjust the parameters of the connected appliances or enter the vacation mode (or away mode). The user may manually select whether to be notified about entering the vacation mode or to have the controller automatically enter the vacation mode. The user may make this selection through at least one of the connected appliances, through a central hub connected to each of the appliances, through the mobile app described above, or the like.

In some embodiments, the controller may continue to monitor the interactive user interfaces of each of the connected appliances. Accordingly, when a user returns after the operating mode has been set to the vacation mode and triggers at least one interactive user interface, the controller may automatically change the adjusted operating mode back to the standard operating mode. In detail, the controller may automatically change each adjusted parameter for each connected appliance in response to a single interactive user interface being triggered. Additionally or alternatively, the timer sequence may be reset to a zero count, and method 300 may return to step 302.

However, in some embodiments, the user may select priority appliances among the connected appliances to return to the standard operating mode. These priority appliances may be automatically adjusted back to the standard operating mode when a single interactive user interface is triggered. Subsequent appliances may be adjusted back to the standard operating mode upon direct interaction between the user and each subsequent appliance.

In alternate embodiments, the controller may continually monitor the location of the user via the remote device. For instance, the controller may determine that the user has returned inside the predetermined distance from the one or more connected appliances. Accordingly, the controller may send a prompt to the remote device of the user to change the adjusted operating mode back to the standard operating mode. Additionally or alternatively, the controller may automatically change the adjusted operating mode back to the standard operating mode upon determining that the user has returned inside the predetermined distance from the one or more connected appliances.

As illustrated, each of first appliance 10, second appliance 11, remote device 202, or any other devices or appliances in system of connected appliances 200 may include or be operably coupled to a controller, identified herein generally by reference numeral 230. As used herein, the terms "processing device," "computing device," "controller," or the like may generally refer to any suitable processing device, such as a general or special purpose microprocessor, a microcontroller, an integrated circuit, an application specific integrated circuit (ASIC), a digital signal processor (DSP), a field-programmable gate array (FPGA), a logic device, one or more central processing units (CPUs), a graphics processing units (GPUs), processing units performing other specialized calculations, semiconductor devices, etc. In addition, these "controllers" are not necessarily restricted to a single element but may include any suitable number, type, and configuration of processing devices integrated in any suitable manner to facilitate appliance operation. Alternatively, controller 110 may be constructed without using a microprocessor, e.g., using a combination of discrete analog and/or digital logic circuitry (such as switches, amplifiers, integrators, comparators, flip-flops, AND/OR gates, and the like) to perform control functionality instead of relying upon software.

Controller 230 may include, or be associated with, one or more memory elements or non-transitory computer-readable storage mediums, such as RAM, ROM, EEPROM, EPROM, flash memory devices, magnetic disks, or other suitable memory devices (including combinations thereof). These memory devices may be a separate component from the processor or may be included onboard within the processor. In addition, these memory devices can store information and/or data accessible by the one or more processors, including instructions that can be executed by the one or more processors. It should be appreciated that the instructions can be software written in any suitable programming language or can be implemented in hardware. Additionally, or alternatively, the instructions can be executed logically and/or virtually using separate threads on one or more processors.

For example, controller 230 may be operable to execute programming instructions or micro-control code associated with an operating cycle of an appliance. In this regard, the instructions may be software or any set of instructions that when executed by the processing device, cause the processing device to perform operations, such as running one or more software applications, displaying a user interface, receiving user input, processing user input, etc. Moreover, it should be noted that controller 230 as disclosed herein is capable of and may be operable to perform any methods, method steps, or portions of methods as disclosed herein. For example, in some embodiments, methods disclosed herein may be embodied in programming instructions stored in the memory and executed by controller 230. The memory devices may also store data that can be retrieved, manipulated, created, or stored by the one or more processors or portions of controller 230. The data can include, for instance, data to facilitate performance of methods described herein. The data can be stored locally (e.g., on controller 230) in one or more databases and/or may be split up so that the data is stored in multiple locations. In addition, or alternatively, the one or more database(s) can be connected to controller 230 through any suitable communication module, communication lines, or network(s).

It should be appreciated that the exemplary functions and configurations of the external communication system provided herein are used only as examples to facilitate description of aspects of the present subject matter. System configurations may vary, other communication devices may be used to communicate directly or indirectly with one or more associated appliances, other communication protocols and steps may be implemented, etc. These variations and modifications are contemplated as within the scope of the present subject matter.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of operating an appliance, the appliance comprising an interactive user interface, a timer, and a sensor in communication with the interactive user interface and the timer, the method comprising:
    obtaining a predetermined time threshold;
    determining that the interactive user interface has been triggered;
    initiating a timer sequence via the timer in response to determining that the interactive user interface has been triggered;
    determining that the timer sequence has elapsed the predetermined time threshold;
    directing an emission of an input request to a user in response to determining that the timer sequence has elapsed the predetermined time threshold, the input request comprising a prompt to enter a predetermined operating mode;
    receiving an input response from the user to enter the predetermined operating mode; and
    implementing a responsive action in response to determining that the timer sequence has elapsed the predetermined time threshold, wherein the responsive action comprises adjusting one or more settings of the appliance.

2. The method of claim 1, further comprising:
    determining that the interactive user interface has been triggered after the timer sequence has been initiated and before the timer sequence has elapsed the predetermined time threshold;
    halting the timer sequence; and
    resetting the timer sequence to a zero count.

3. The method of claim 1, wherein prompting the user to enter the predetermined operating mode comprises:
    prompting the user to alter a standard operating mode of the appliance to an adjusted operating mode.

4. The method of claim 1, wherein the responsive action further comprises:
   alerting the user via a remote device that a standard operating mode has been changed to an adjusted operating mode.

5. The method of claim 4, further comprising:
   determining that the interactive user interface has been triggered after alerting the user that the standard operating mode has been changed to the adjusted operating mode; and
   changing the adjusted operating mode back to the standard operating mode.

6. The method of claim 4, further comprising:
   determining that the remote device of the user is outside of a predetermined distance from the appliance in response to determining that the timer sequence has elapsed the predetermined time threshold.

7. The method of claim 1, wherein the interactive user interface comprises at least one of a control panel comprising buttons or knobs, a door, a proximity sensor, a liquid dispenser, or a touch screen provided on the appliance.

8. The method of claim 1, wherein the appliance comprises a plurality of appliances, the plurality of appliances comprising two or more of a refrigerator, an oven range, a microwave, a laundry appliance, a water heater, a dishwasher, or a thermostat.

9. The method of claim 8, further comprising a central computing hub in communication with the plurality of appliances via a network, the method further comprising:
   establishing a unique timer sequence for each appliance of the plurality of appliances; and
   resetting each unique timer sequence in response to any one interactive user interface of the plurality of appliances being triggered.

10. The method of claim 1, wherein the predetermined time threshold is between twelve hours and forty-eight hours.

11. An appliance system, comprising:
   an appliance, the appliance being operated according to one or more settings;
   an interactive user interface provided on the appliance;
   a sensor provided within the appliance for sensing a triggering of the interactive user interface;
   a remote device in communication with the appliance via a network; and
   a controller in communication with the interactive user interface and the sensor, wherein the controller is configured to perform a series of operations, the series of operations comprising:
      obtaining a predetermined time threshold,
      determining, via the sensor, that the interactive user interface has been triggered,
      initiating a timer sequence in response to determining that the interactive user interface has been triggered,
      determining that the timer sequence has elapsed the predetermined time threshold,
      determining that the remote device is outside of a predetermined distance from the appliance in response to determining that the timer sequence has elapsed the predetermined time threshold,
      implementing a responsive action in response to determining that the timer sequence has elapsed the predetermined time threshold, the responsive action comprising adjusting the one or more settings of the appliance from a standard operating mode to an adjusted operating mode,
      determining that the remote device is inside the predetermined distance from the appliance after adjusting the one or more settings of the appliance, and
      directing an emission of an input request to the remote device to restore the one or more settings of the appliance to the standard operating mode.

12. The appliance system of claim 11, wherein the series of operations further comprises:
   determining that the interactive user interface has been triggered after the timer sequence has been initiated and before the timer sequence has elapsed the predetermined time threshold;
   halting the timer sequence; and
   resetting the timer sequence to a zero count.

13. The appliance system of claim 11, wherein the responsive action comprises alerting a user via the remote device that the standard operating mode has been changed automatically to the adjusted operating mode.

14. The appliance system of claim 13, wherein the series of operations further comprises:
   determining that the interactive user interface has been triggered after alerting the user that the standard operating mode has been changed automatically to the adjusted operating mode; and
   changing the adjusted operating mode back to the standard operating mode.

15. The appliance system of claim 11, wherein the interactive user interface comprises at least one of a control panel comprising at least one of a button or a knob, a door, a proximity sensor, a liquid dispenser, or a touch screen provided on the appliance.

16. The appliance system of claim 11, wherein the appliance comprises a plurality of appliances, the plurality of appliances comprising two or more of a refrigerator, an oven range, a microwave, a laundry appliance, a water heater, a dishwasher, or a thermostat.

17. The appliance system of claim 16, further comprising a central computing hub in communication with the plurality of appliances via a network, wherein the series of operations further comprises:
   establishing a unique timer sequence for each appliance of the plurality of appliances; and
   resetting each unique timer sequence in response to any one interactive user interface of the plurality of appliances being triggered.

18. The appliance system of claim 11, wherein the predetermined time threshold is between twelve hours and forty-eight hours.

* * * * *